United States Patent

[11] 3,589,673

| [72] | Inventor | Lee H. Cruse<br>Springfield, Mo. |
|---|---|---|
| [21] | Appl. No. | 738,647 |
| [22] | Filed | June 20, 1968 |
| [45] | Patented | June 29, 1971 |
| [73] | Assignee | Foster Manufacturing Co., Inc.<br>Springfield, Mo.<br>Continuation-in-part of application Ser. No. 590,721, Oct. 31, 1966, now Patent No. 3,477,688. |

[54] FLUID LINE COUPLING
3 Claims, 4 Drawing Figs.

[52] U.S. Cl. ................................................. 251/149.9
[51] Int. Cl. .................................................. F16l 29/00,
  F16l 37/28
[50] Field of Search ........................................ 251/149.9,
  344; 245/313, 316, 317

[56] References Cited
UNITED STATES PATENTS

| 2,673,750 | 3/1954 | Scheiwel ..................... | 285/313 |
| 3,127,149 | 3/1964 | Cluse .......................... | 251/149.9 |
| 3,404,705 | 10/1968 | Zopf et al. .................. | 251/149.9 |

*Primary Examiner*—William R. Cline
*Attorney*—John D. Pope, III

ABSTRACT: A quick-connect coupling for fluid line hose couplings includes a body portion adapted to receive a conventional male hose coupler element. The coupling has two axially aligned sleeves mounted on the exterior. The latching sleeve actuates the mechanism which engages the male coupler element while the valve sleeve is part of the valve means for blocking the flow of fluid through the female coupling. The valve sleeve has a bayonet slot which receives a radially projecting pin on the body, optionally locking the valve sleeve in an open position. It then abuts against the latching sleeve and prevents the latter from moving to the unlocked or disengaged position with respect to the male coupler. Between the latching and valve sleeves is a spring biasing the latching sleeve toward the engaged position and urging the valve sleeve to and maintaining it in the closed position when it is not positively locked in the open position.

INVENTOR
LEE H. CRUSE

BY John D. Pope

ATTORNEY

FLUID LINE COUPLING

This application is a continuation-in-part of my copending application Ser. No. 590,721, filed Oct. 31, 1966 now Pat. No. 3,477,688.

This invention relates to fluid line couplings and, more particularly, to a quick-connect hose coupling including valve means.

The present invention provides a female hose or fluid line coupling of the quick-connect variety, the coupling comprising a body portion adapted to receive a conventional male hose coupler element and having two axially aligned sleeves mounted on the external surface thereof. The forward or latching sleeve actuates the latching mechanism which engages the male coupler element, while the rear or valve sleeve forms part of the valve means for blocking the flow of fluid through the female coupling. The valve sleeve has a bayonet slot which receives a radially projecting pin located on the body so that the valve sleeve can be optionally locked in an open position wherein it will endwise abut against the forward or latching sleeve and thereby prevent the latter from moving to the unlocked or disengaged position with respect to the male coupler. Between the latching and valve sleeves is a spring which biases the latching sleeve toward the forward or engaged position and urges the valve sleeve to and maintains it in the closed position when it is not positively locked in the open position.

It is often desirable, as a matter of safety, to vent high-pressure pneumatic or other fluid hoses to the atmosphere when they are connected or disconnected so that no pressure differential exists across the separable male and female coupling elements at which the connection or disconnection occurs. The forces generated by a pressure differential across partially joined coupling elements can propel one of the elements against a nearby object or individual and cause damage or injury. To overcome this hazard, a few couplings of current manufacture incorporate manually operable valves for blocking the air line immediately prior to the actual connecting means embodied therein so that no pressure differential exists at the juncture of the two separable coupler elements. Such a valve precludes any loss of fluid during coupling or uncoupling and therefore such couplings possess a distinct advantage over the self-sealing variety. Furthermore, such couplings permit one to optionally close or block the fluid line even when the coupling elements are connected. One of the more sophisticated types of manually operable valved hose couplings is the dual-sleeve variety in which the female coupling includes a body having two axially aligned sleeves mounted on the external surface thereof. One of the sleeves actuates the latching mechanism which engages the male coupler, while the other sleeve is part of the valve. The sleeves are located on the body so that the latching sleeve when moved to the disengaged or cocked position with respect to the male coupler element will abut against the valve sleeve and move it into a closed position if it is not already in the closed position. Such a coupling is described and illustrated in U.S. Pat. No. 3,127,149.

The dual-sleeve valved couplings of current manufacture, while an improvement over previous valved couplings, nevertheless possess certain disadvantages. No satisfactory locking means is provided for holding the valve sleeve in the open position so that it cannot be unauthorizedly moved to the closed position when the sleeve is snagged or otherwise caught on a protrusion or other object as the hose and coupling are dragged across a floor or workbench. Moreover, such couplings are often complicated and require a time-consuming complete disassembly to replace o-rings and other replaceable components subject to wear. Furthermore, although often it is desirable to hold the valve closed even when the female coupling is connected to the male coupler, no means are provided on current couplings for maintaining the valve sleeve in a closed position under such conditions.

Among the several objects of the present invention may be noted the provision of a valved hose coupling having valve and latching sleeves and means for simultaneously and positively holding such sleeves in the open and engaged positions, respectively; the provision of a valved hose coupling of the type stated wherein the valve sleeve will automatically return to the closed position when not positively held in the open position; the provision of a valved hose coupling in which the components subject to wear can easily be replaced with a minimum amount of disassembly; the provision of a hose coupling of the type stated in which the valve sleeve is positively held in the closed position when the latching sleeve is in the disengaged position; and the provision of a hose coupling which is simple and rugged in construction, durable in performance, and easy to manufacture. Other objects and features will be in part apparent and in part pointed out hereinafter.

In the accompanying drawings, in which one of various possible embodiments of the invention is illustrated, FIG. 1 is an elevational view of a coupling constructed in accordance with and embodying the present invention, the coupling being aligned for reception of a mating coupler element;

Corresponding reference characters indicate corresponding parts throughout the several views of the drawings.

Figure 1:
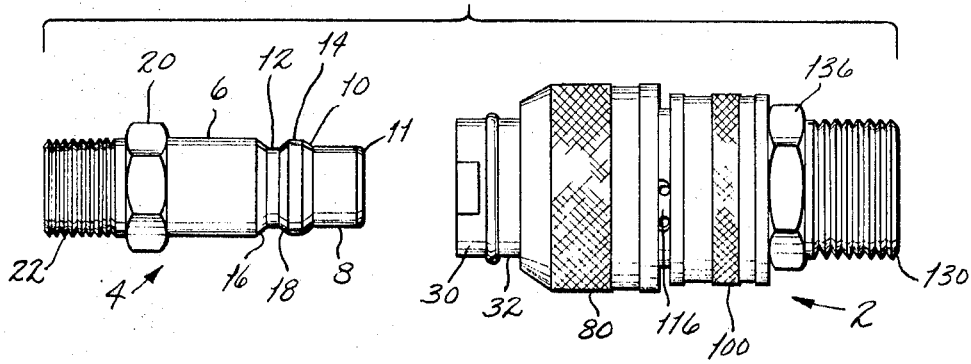

Referring now to the drawings, 2 designates a female hose coupling which is adapted to receive a conventional male coupler 4. Since the latter is conventional in design and construction, it is sufficient to note that it includes a tubular stem 6 which is turned down at one end in the provision of a diametrally reduced nipple 8 which inwardly terminates at a chamfered annular shoulder 10 and outwardly terminates at an arcuate end face 11. Inwardly from shoulder 10 stem 6 is further turned down in the formation of an annular locking groove 12 and an annular ridge 14, the latter being located intermediate nipple 8 and groove 12. The sides of groove 12 are defined by outwardly diverging beveled faces 16, 18. At its other end stem 6 terminates at an enlarged hexagonal portion 20 which integrally merges into an axially extending threaded end 22 for attachment to a conventional pneumatic hose.

Figure 2:
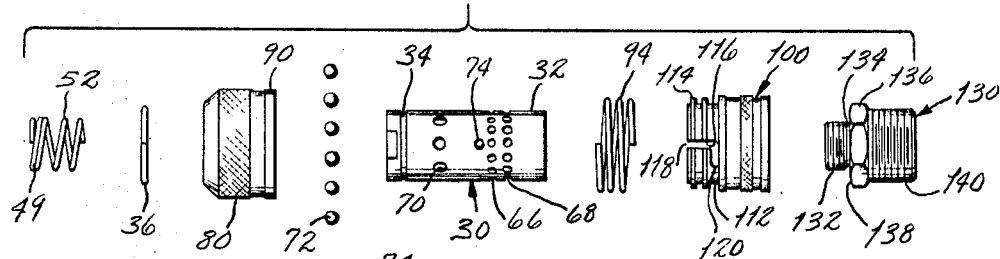
FIG. 2 is an exploded elevational view of the coupling.
Figure 3:
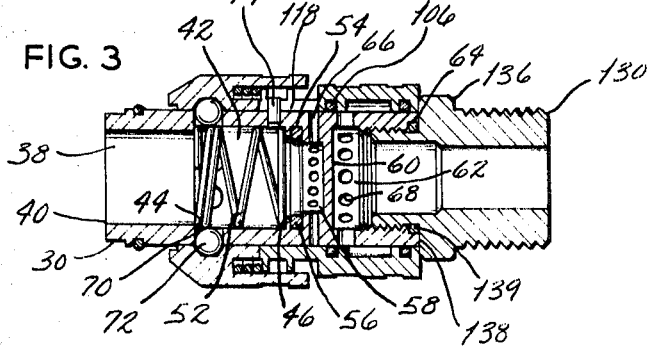
FIG. 3 is a sectional view of the coupling showing the latching sleeve in the cocked position and the valve sleeve in the closed position.

Female coupling 2 includes a body 30 having a substantially unobstructed cylindrical outer surface 32 which is turned down at its forward end (the left end as seen in FIG. 2) in the provision of an annular groove 34 for snap-fitting reception of a split locking ring 36 formed preferably of spring wire. From its forward end, body 30 is relieved in the formation of a forward bore 38 which is sized for slidable reception of a stem 6 of male coupler 4 and is further flared outwardly at its forward end in the formation of a short bellmouth 40. Near its inner end, bore 38 is diametrally enlarged in the provision of an enlarged annular recess 42, the ends of which are defined by front and rear shoulders 44, 46, respectively. Slidably mounted with recess 42 is a retainer spring 52 which is formed with two convolutions 49 juxtaposed to project inwardly into bore 38. Spring 52, at its other end, abuts rear shoulder 46. Spring 52 is diametrally reduced by any suitable means, such as a tubular compression member, and then passed through forward bore 38 and into recess 42 where it expands to its diametral size.

Inwardly from rear shoulder 46 body 30 is provided with an internal annular groove 54 into which an elastomeric O-ring 56 of substantially circular cross-sectional shape is fitted, the inner margins of O-ring 56 being disposed radially inwardly from rear shoulder 46. Beyond O-ring 56, bore 38 opens into a diametrally reduced coaxial terminal bore 58, the end of which is defined by an imperforate intermediate wall 60 formed integral with body 30.

From its opposite end, body 30 is also relieved in the formation of a partially threaded rear bore 62 located coaxially with respect to bores 38, 58, bore 62 also inwardly terminating at intermediate wall 60. At its outer or rear end, bore 62 is somewhat enlarged in the provision of an annular recess 64. On each side of and in close proximity to wall 60, body 30 is provided with a plurality of circumferentially spaced radial ports 66, 68, which establish communication between the exterior of body 30 and terminal bore 58 and rear bore 62, respectively. Similarly, in the vicinity of front shoulder 44 of recess 42, body 30 is provided with a plurality of circumferentially spaced radial bores 70 which are located so that the end convolutions 49 of spring 52 will at least partially cover such bores when spring 52 is in its normal unbiased position. Fitted into bores 70 are retainer balls 72, the diameter of which are equal and somewhat greater than the axial length of bores 70, that is, the diameter of each ball 72 is greater than the radial distance between the internal surface defining bore 38 and external cylindrical surface 32. The inner ends of bores 70 are diametrally reduced slightly so that balls 72 will not fall into forward bore 38 when spring 52 is compressed. In the vicinity of annular recess 42 immediately forward from rear shoulder 46, body 30 is snugly fitted with a rigid pin 74 which projects radially beyond cylindrical surface 32.

Figure 4:
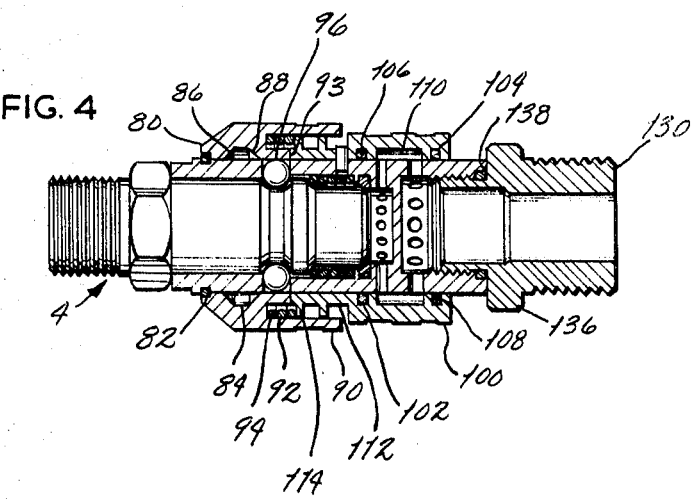
FIG. 4 is a sectional view of the coupling in retentive engagement with the mating coupler element with the valve sleeve in the open position.

Slidably mounted on the forward portion of body 30 for axial movement on cylindrical surface 32 is a latching sleeve 80 which is counterbored from its forward end to provide an annular recess 82 adapted to seat around and clear locking ring 36, locking ring 36 being adapted to engage the radial or shoulder-forming surface of recess 82 and thereby limit the forward movement of sleeve 80 on body 30. Rearwardly from recess 82, sleeve 80 is provided with an internal annular clearance groove 84 having front and rear tapered surfaces 86, 88. Groove 84, when in the proper axial position, accommodates the outer segments of retainer balls 72 so that such balls do not project into bore 38. From its rear end, latching sleeve 80 is counterbored to form a diametrally enlarged skirt 90 and an axially extending trepanned groove 92, the latter of which rearwardly terminates at an abutment shoulder 93. Fitted within groove 92 and completely shielded from the exterior of coupling 2 by means of skirt 90 is a helical spring 94 which, when completely compressed, is housed entirely within trepanned groove 92. Forwardly from shoulder 93, sleeve 80 is provided with an axially extending cylindrical covering surface 96 which snugly but slidably engages cylindrical surface 32 of body 30 and covers bores 70 when sleeve 80 engages locking ring 36 (FIG. 4).

Slidably mounted on the rear portion of body 30 is a valve sleeve 100 having front and rear internal annular grooves 102, 104, into which O-rings 106, 108, respectively, are fitted to provide a fluidtight seal between the interior of sleeve 100 and cylindrical surface 32. Intermediate O-rings 106, 108, valve sleeve 100 is internally relieved in the formation of internal annular channel 110 having sufficient axial width to encircle both ends of ports 66, 68, at the same time to establish a communicating passage therebetween. At its forward end, valve sleeve 100 is provided with a forwardly projecting cylindrical nose portion 112 which is located in slightly outwardly spaced relation to cylindrical surface 32, but fits within skirt 90 of latching sleeve 80. Slightly inwardly from its forward end nose portion 112 is provided with a radially projecting lip 114 which engages the rear end of spring 94 completely within the confines of skirt 90 so that latching sleeve 80 and valve sleeve 100 are biased away from one another. Nose portion 112 is provided with a bayonet slot 116 which accepts pin 74, slot 116 including an axial section 118 and an adjoining circumferential section 120. When pin 74 engages circumferential section 120 as illustrated in FIG. 4, annular channel 110 encircles both sets of ports 66, 68, thereby permitting communication between the two. However, when pin 74 is disposed within the forward end of axial section 118, O-ring 106 will embrace that portion of cylindrical surface 32 located intermediate ports 66, 68, precluding communication between the two. In the latter position, the forward end of nose portion 112 will be located in close proximity to abutment shoulder 93 of latching sleeve 80. Moreover, the lengths of valve sleeve 100 and latching sleeve 80 are such that when clearance groove 84 of the latter registers with bores 70, sleeve 100 is prevented from moving axially forward on body 30 by abutment shoulder 93 of latching sleeve 80.

Threaded into rear bore 62 is a tubular fitting 130 including a threaded end portion 132 which engages the threads of bore 62 but does not cover ports 68. End portion 132 inwardly terminates at a groove 134 located adjacent an enlarged hexagonal portion 136 which projects beyond cylindrical surface 132 in the formation of a shoulder 138 adapted to engage the rear face of valve sleeve 100 and thereby limit the rearward movement of such sleeve. When sleeve 100 does abut against shoulder 138, O-ring 108 will embrace body 30 intermediate ports 66, 68.

Fitted within groove 134 is an elastomeric O-ring 139 which is compressed into sealingwise engagement with the walls of annular recess 64 surrounding bore 62 to form a fluidtight seal between body 30 and fitting 130. Enlarged hexagonal portion 136 integrally merges into a threaded end 140 for attachment to a conventional air hose. Fitting 130, and for that matter, male coupler 4, can be integrally provided with any of the numerous conventional fastening means currently available for securing hoses and other fluid conduits to such fittings in lieu of threaded ends 140, 22.

When female coupling 2 is disengaged from male coupler 4, latching sleeve 80 of the former will be in a cocked position wherein clearance groove 84 overlies radial bore 70 and retainer spring 52 is at the forward end of annular recess 42 against forward shoulder 44 so that the outer surface of retainer spring 52 at least partially blocks bores 70. This causes retainer balls 72 to project outwardly beyond cylindrical surface 32 and into groove 84. Spring 94 urges latching sleeve 80 forwardly, but movement is prevented by balls 72 which engage rear tapered surface 88 of groove 84. When latching sleeve 80 is presented in the cocked position, valve sleeve 100 must necessarily be in its closed position wherein it abuts shoulder 138 of fitting 130. When cocked, latching sleeve 80 will be disposed somewhat rearwardly from locking ring 36 and since abutment shoulder 93 is presented opposite the forward end of valve sleeve 100, valve sleeve 100 will also be presented rearwardly on body 30. The axial dimensions of the various components of coupling 2 are such that only a slight clearance space exists between the forward face of nose portion 112 and abutment shoulder 93 of latching sleeve 80 when latching sleeve 80 is cocked, thereby precluding axial movement of valve sleeve 100. When valve sleeve 100 abuts shoulder 138 of fitting 130, annular channel 110 overlies only ports 68 or, in other words, O-ring 108 is interposed between ports 66, 68, so as to preclude communication therebetween and prevent fluid escaping from coupling 2. Furthermore, abutment shoulder 93 of latching sleeve 80 will prevent valve 100 from moving forwardly into an open position. When latching sleeve 80 is in the cocked position, spring 94 will be housed almost entirely within trepanned groove 92 and pin 74 will be presented within the forwardmost end of longitudinal section 118 of bayonet slot 116.

To couple male coupler 4 and female coupling 2, stem 6 of the former is inserted into forward bore 38 of the latter. Since nipple 8 is of a somewhat reduced diameter, it will pass into the end convolution of spring 52 and chamfered annular shoulder 10 will engage this end convolution. Further advancement of male coupler 4 compresses spring 52, causing end convolutions 49 to withdraw from covering relation with respect to radial bores 70. When annular ridge 14 on stem 6 passes beyond bores 70, spring 94 will urge latching sleeve 80 forward, causing rear tapered surface 88 of clearance groove 84 to cam retainer balls 72 radially inwardly beyond the external cylindrical surface 32 of body 30 so that a segment of each of such retainer balls 72 projects into annular locking groove 12 on stem 6. Latching sleeve 80 will advance until its forward end engages locking ring 36, in which position cylindrical covering surface 96 will be disposed in overlying relation to bores 70, precluding outward radial movement of retainer balls 72, which firmly secures balls 72 within locking groove 12 so as to prevent withdrawal or further advancement of male coupler 4 (FIG. 4). When stem 6 is locked within bore 38 as previously described, rounded end face 11 of nipple 8 engages and slightly compresses O-ring 56 to form a fluidtight seal therewith. Although the forward disposition of latching sleeve 80 enables spring 94 to expand outwardly from trepanned groove 92, it still remains in engagement with lip 114 and continues to urge valve sleeve 100 into abutment with shoulder 138 of fitting 130. The forward end of nose portion 112 of valve sleeve 100 is now disposed considerably to the rear of abutment shoulder 93 located on latching sleeve 80 and accordingly valve sleeve 100 is free for axial forward movement on body 30 against the bias of spring 94.

When valve sleeve 100 is moved forward to a point where pin 74 aligns with circumferential section 120 of bayonet slot 116, annular channel 110 will overlie both sets of ports 66, 68, and establish communication therebetween. Thus, the pressurized fluid will flow through fitting 130 into rear bore 62 from which it will exit adjacent wall 60 through ports 68 which discharge it into annular channel 110. Since channel 110 also overlies ports 66 the pressurized fluid will pass into ports 66 and thence into terminal bore 58 from which it is discharged into stem 6 of male coupler 4. To positively lock valve sleeve 100 in the open position, it is merely rotated slightly with respect to body 30 so as to bring locking pin 74 into engagement with circumferential section 120 of bayonet slot 116. When valve sleeve 100 is locked in such open position a substantial portion of nose portion 112 will again be encircled by skirt 90 and the forward margin of the former will again be presented in close proximity to abutment shoulder 93 of latching sleeve 80. Thus, latching sleeve 80 cannot be moved rearwardly on body 30 to its cocked or disengaged position and male coupler 4 cannot be withdrawn from forward bore 38 as long as male coupler 4 is subject to elevated pressures.

To detach male coupler 4 from female coupling 2, valve sleeve 100 must first be rotated with respect to body 30 until locking pin 74 aligns with longitudinal section 118 of bayonet slot 116. At this point, spring 94 will urge valve sleeve 100 rearwardly until it abuts against shoulder 138 of fitting 130, in which position O-ring 108 will be interposed between radial ports 66, 68, to preclude communication therebetween. Nose portion 112 of valve sleeve 100 will overlie ports 66 in slightly outwardly spaced relation thereto so that any pressurized fluid entrapped downstream from intermediate wall 60 will escape. In other words, when valve sleeve 100 is in the closed position, terminal bore 58 and the interior of tubular male coupler 4 are vented to the atmosphere through radial ports 66. Accordingly, no pressure differential will exist at the juncture of female coupling 2 and male coupler 4 within forward bore 38 when male coupler 4 is detached. Latching sleeve 80 is next moved rearwardly on body 30 and when clearance groove 84 comes into registration with radial bores 70 retainer spring 52 will expand. Convolutions 49 will bear against chamfered shoulder 10 of stem 6 urging male coupler 4 partially out of forward bore 38. Simultaneously, beveled face 18 of locking groove 12 will cam balls 72 outwardly within radial bores 70 until a segment of each ball 72 protrudes somewhat beyond cylindrical surface 32, thereby blocking forward movement of latching sleeve 80. Balls 72 will subsequently ride up onto annular ridge 14 of stem 6 and thereafter convolutions 49 of retainer spring 52 will move into covering relation with respect to bores 70 so as to preclude inward movement of balls 72, thereby again placing latching sleeve 80 in the cocked position. At this point male coupler 4 will slide freely out of forward bore 38.

From the foregoing, it is readily apparent that male coupler 4 cannot be detached from female coupling 2 while the former is subject to elevated pressures and accordingly workmen need not fear such couplings or be concerned with one element being propelled across a floor or workbench and injuring a nearby individual or damaging property. Moreover, female coupling 2 includes means for positively locking valve sleeve 100 in the open position so that even if it does become momentarily snagged on some object as it is drawn across a floor or workbench, valve sleeve 100 will not move to the closed or a partially closed position but will remain in the open position. However, when not in the locked position, valve sleeve 100 will be biased against fitting 130 in a closure-forming relation with respect to ports 68. Similarly, when latching sleeve 80 is cocked, valve sleeve 100 is positively held in the closed position; and fluid cannot escape from the system through coupling 2 when male coupler 4 is detached therefrom.

Inertial forces will not be of sufficient magnitude to overcome the bias of spring 52 when female coupling 2 is heavily jarred or subjected to a severe axially directed mechanical shock. This prevents latching sleeve 80 from unauthorizedly moving from a cocked to an uncocked or forward position when coupling 2 is subjected to such jars or shocks.

Finally, although elastomeric O-rings 106, 108, will in time wear out and permit fluid to escape, they can be quickly replaced merely by unscrewing fitting 130 and thereafter withdrawing valve sleeve 100 from body 30 to gain access to the interior of the sleeve.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What I claim is:

1. A quick-connect fluid line coupling for receptive engagement with a mating coupler element; said coupling comprising a body provided with a forward bore adapted to receive said mating coupler element; said body including a plurality of radial bores opening into said forward bore; retainer balls shiftably mounted within said radial bores and having a diameter greater than the axial length of said radial bores; latching means carried by said body for retentively engaging said mating coupler element; said latching means being adapted to move from a cocked position wherein said latching means awaits reception of said coupler element to a latched position wherein it holds said retainer balls at least partially within said forward bore for retentively engaging said coupler element; a retainer spring within said forward bore, said retainer spring being compressible in response to insertion of said coupler element into said forward bore from an extended position wherein it engages said retainer balls and urges them radially outwardly to a compressed position wherein it is disengaged from said retainer balls; said retainer balls being adapted to engage said latching means and hold it in its cocked position when said retainer spring is in its extended position; valve means on said body for interrupting the flow of fluid to said forward bore, said valve means including a valve element adapted to move from a closed position wherein fluid is prevented from entering said forward bore to an open position wherein fluid flows into said forward bore; and spring means between said latching means and said valve element for urging them toward their latched and closed positions respectively.

2. A coupling according to claim 1 wherein said retainer spring is a helical spring; at least one convolution of said retainer spring engaging said retainer elements prior to the insertion of said mating coupler element.

3. A coupling according to claim 1 wherein said latching means includes a latching sleeve slidably mounted for axial movement on the outer surface of said body; said latching sleeve having an annular clearance groove adapted to overlie the outer ends of said radial bores when said latching means in in its cocked position; said clearance groove being adapted to accommodate portions of said retainer balls for holding said latching means in its cocked position.